United States Patent
Lemke et al.

(10) Patent No.: US 9,797,796 B2
(45) Date of Patent: Oct. 24, 2017

(54) HYDRAULIC MEASURING MECHANISM WITH COPLANAR PRESSURE INPUTS AND PRESSURE DIFFERENCE SENSOR HAVING SUCH A MEASURING MECHANISM

(71) Applicant: Endress + Hauser GmbH + Co. KG, Maulburg (DE)

(72) Inventors: Benjamin Lemke, Berlin (DE); Michael Noack, Beelitz (DE); Anh Tuan Tham, Berlin (DE); Rafael Teipen, Berlin (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 100 days.

(21) Appl. No.: 14/652,821

(22) PCT Filed: Dec. 6, 2013

(86) PCT No.: PCT/EP2013/075747
§ 371 (c)(1),
(2) Date: Jun. 17, 2015

(87) PCT Pub. No.: WO2014/095413
PCT Pub. Date: Jun. 26, 2014

(65) Prior Publication Data
US 2015/0369683 A1 Dec. 24, 2015

(30) Foreign Application Priority Data

Dec. 21, 2012 (DE) ......................... 10 2012 113 042

(51) Int. Cl.
*G01L 13/00* (2006.01)
*G01L 13/06* (2006.01)
(Continued)

(52) U.S. Cl.
CPC ............ *G01L 13/06* (2013.01); *G01L 9/0072* (2013.01); *G01L 13/025* (2013.01); *G01L 19/0023* (2013.01)

(58) Field of Classification Search
CPC ....... G01L 13/00; G01L 13/06; G01L 13/025; G01L 9/00; G01L 9/12; G01L 9/0072; G01L 19/00; G01L 19/0023
See application file for complete search history.

(56) References Cited

U.S. PATENT DOCUMENTS

| 4,466,290 A | 8/1984 | Frick |
| 4,668,889 A * | 5/1987 | Adams .................... G01L 13/00 310/338 |

(Continued)

FOREIGN PATENT DOCUMENTS

| CN | 101180526 A1 | 5/2008 |
| CN | 102232203 A | 11/2011 |

(Continued)

OTHER PUBLICATIONS

Inglish Translation of International Preliminary Report on Patentability, WIPO, Geneva, Jun. 23, 2015.

(Continued)

Primary Examiner — Nguyen Ha
(74) Attorney, Agent, or Firm — Bacon & Thomas, PLLC

(57) ABSTRACT

A hydraulic measuring mechanism for registering pressure differences, comprising a measuring mechanism platform having a process connection surface and two pressure input openings, in which, in each case, a pressure tube is arranged, which protrudes from a rear side of the measuring mechanism platform to support a pressure difference measuring cell, wherein the pressure tubes are connected pressure-tightly with the measuring mechanism platform from the process connection surface.

10 Claims, 2 Drawing Sheets

(51) Int. Cl.
  *G01L 19/00* (2006.01)
  *G01L 9/00* (2006.01)
  *G01L 9/12* (2006.01)
  *G01L 13/02* (2006.01)

(56) References Cited

U.S. PATENT DOCUMENTS

| | | |
|---|---|---|
| 4,833,922 A | 5/1989 | Frick et al. |
| 4,841,777 A | 6/1989 | Hershey et al. |
| 7,401,522 B2 | 7/2008 | Broden et al. |
| 7,685,879 B2 | 3/2010 | Kang et al. |
| 7,827,866 B2 | 11/2010 | Galinsky |
| 7,918,134 B2 | 4/2011 | Hedtke et al. |
| 2010/0083768 A1 | 4/2010 | Hedtke et al. |
| 2012/0079884 A1 | 4/2012 | Broden et al. |
| 2013/0160560 A1* | 6/2013 | Strei .................. G01L 9/0042 73/706 |
| 2014/0090476 A1* | 4/2014 | Miller ............... G01L 19/0046 73/706 |

FOREIGN PATENT DOCUMENTS

| | | | |
|---|---|---|---|
| DE | 68907427 T2 | 11/1993 | |
| DE | 19516326 A1 | 11/1996 | |
| DE | 69531258 T2 | 4/2004 | |
| DE | 102005002658 A1 | 7/2006 | |
| DE | 102007052395 A1 | 5/2009 | |
| DE | 102008019054 A1 | 11/2009 | |
| DE | 112004002995 B4 | 12/2010 | |
| JP | 60169731 A * | 9/1985 | ........... G01L 13/025 |
| WO | 8302004 | 6/1983 | |
| WO | 8809921 | 12/1988 | |
| WO | 8809921 A1 | 12/1988 | |
| WO | 9627124 | 9/1996 | |
| WO | 2006076996 A1 | 7/2006 | |

OTHER PUBLICATIONS

International Search Report, EPO, The Netherlands, Apr. 22, 2014.
German Search Report, German PTO, Apr. 5, 2013.

\* cited by examiner

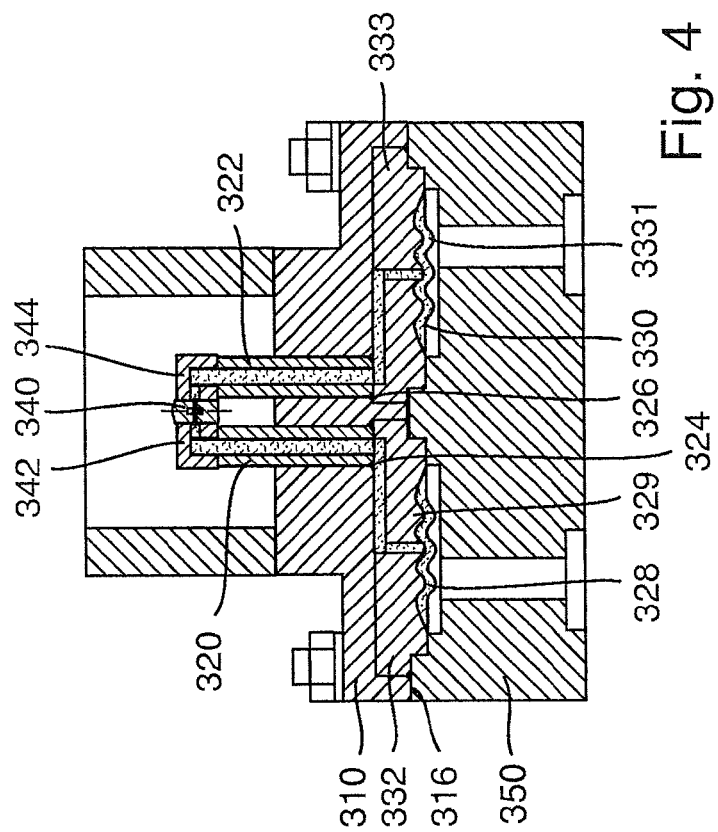
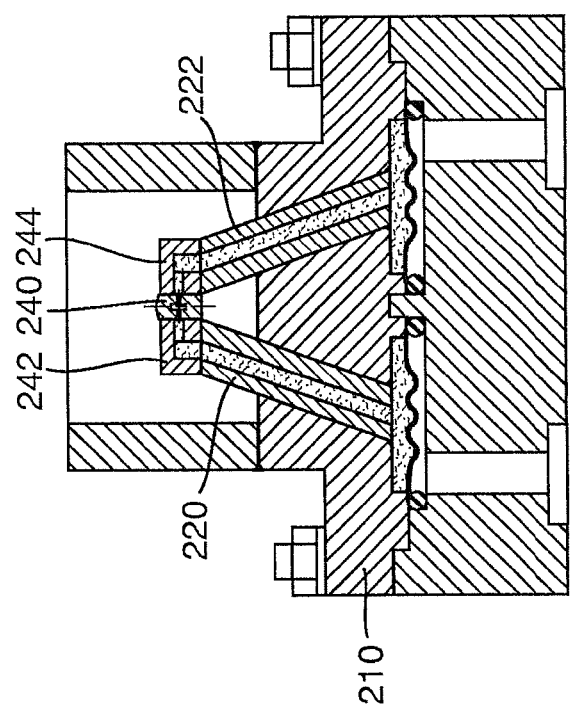

HYDRAULIC MEASURING MECHANISM WITH COPLANAR PRESSURE INPUTS AND PRESSURE DIFFERENCE SENSOR HAVING SUCH A MEASURING MECHANISM

TECHNICAL FIELD

The present invention relates to a hydraulic measuring mechanism for registering pressure differences and a pressure difference sensor having such a measuring mechanism.

BACKGROUND DISCUSSION

Hydraulic measuring mechanisms for registering pressure differences comprise, usually, a measuring mechanism platform having a first pressure input opening and a second pressure input opening, from which, in each case, a hydraulic path extends to a pressure difference measuring cell, in order to supply the pressure difference measuring cell with the first pressure and the second pressure, whose difference is to be measured by the pressure difference measuring cell. A pressure difference measuring cell includes generally a measuring cell platform with two measuring chambers in its interior, which are separated from one another by a measuring diaphragm. The two measuring chambers are, in each case, contactable through a measuring chamber opening with one of the two pressures, so that the measuring diaphragm has an elastic deformation dependent on the difference between the two pressures.

The pressure input openings of the measuring mechanism platform are, usually, sealed by flexible, metal, isolating diaphragms, which, in each case, transfer a pressure presiding on an outside of the isolating diaphragm into the hydraulic path. In the case of measuring mechanisms with coplanar pressure input openings, the pressure inputs lie next to one another on a process connection surface of the measuring mechanism platform. Such measuring mechanisms with coplanar pressure inputs are disclosed, for example, in European Patents, EP 0 370 013 B1, EP 0 560 875 B1, EP 0 774 652 B2, and EP 1 216 404 B1. The hydraulic paths comprise, for example, capillary lines, which extend from a rear side surface of the process connection body, which faces away from the process connection surface, to the pressure measuring cell.

The capillary lines are connected, for example, by an encircling weld seam, pressure-tightly with the measuring mechanism platform and therewith hydraulically coupled, in each case, to one of the pressure input openings.

Providing the encircling weld seams proves, however, to be difficult, since the neighboring capillary tubes get in the way of the circling of the respectively other capillary tube with a welding apparatus.

SUMMARY OF THE INVENTION

It is, therefore, an object of the present invention to provide a hydraulic measuring mechanism having coplanar pressure inputs and a pressure difference sensor having such a measuring mechanism, which can be simply and reliably manufactured.

The object is achieved according to the invention by the measuring mechanism and the pressure difference sensor.

The hydraulic measuring mechanism of the invention for registering pressure differences includes: A measuring mechanism platform having a process connection surface facing essentially in one direction, wherein the measuring mechanism platform has a first pressure input opening, which extends from the process connection surface of the measuring mechanism platform to a rear surface of the measuring mechanism platform, wherein the measuring mechanism platform has a second pressure input opening, which extends from the process connection surface of the measuring mechanism platform to the rear surface of the measuring mechanism platform; a first isolating diaphragm, which closes the first pressure input opening on a process connection surface end of the first pressure input opening; a second isolating diaphragm, which closes the second pressure input opening on a process connection surface end of the second pressure input opening; a first pressure tube, which is arranged with a section in the first pressure input opening, wherein the first pressure tube protrudes out from the rear surface of the measuring mechanism platform; and a second pressure tube, which is arranged with a section in the second pressure input opening, wherein the second pressure tube protrudes out from the rear surface of the measuring mechanism platform; wherein the first and second pressure tubes are connected pressure-tightly with the measuring mechanism platform, characterized in that at least the first pressure tube is connected from the process connection surface side pressure-tightly with the measuring mechanism platform.

In a further development of the invention, the first pressure tube and the second pressure tube are connected from the process connection surface side pressure-tightly with the measuring mechanism platform.

In a further development of the invention, the first pressure tube and the second pressure tube are connected pressure-tightly with the measuring mechanism platform by joining, especially welding.

By manufacturing the pressure-tight connection between a pressure tube and the measuring mechanism platform from the process connection surface side, especially circling joining methods, such as, for example, welding, are not hindered by the respectively other tube, which protrudes out from the rear side of the measuring mechanism platform.

In a further development of the invention, at least one pressure tube extends in the measuring mechanism platform inclined relative to a surface normal of the process connection surface.

In this way, especially the separation of the rear sections of the pressure tubes can be lessened relative to one another, which can be advantageous especially for mounting of miniaturized pressure difference measuring cells.

In a further development of the invention, the hydraulic measuring mechanism further includes at least a first diaphragm bed body, which has a corrugated diaphragm bed on a surface facing away from the measuring mechanism platform, wherein the diaphragm bed body is connected pressure-tightly with the measuring mechanism platform from the process connection surface side after the pressure-tight connecting of the at least a first pressure tube with the measuring mechanism platform.

In a further development of the invention, at least one isolating diaphragm is formed by pressing against the diaphragm bed of an isolating diaphragm body.

The use of a diaphragm bed body enables providing a diaphragm bed, without degrading such by the pressure tight connecting of the pressure tube with the measuring mechanism platform.

In another further development of the invention, no corrugated diaphragm bed is present between at least one isolating diaphragm and the pressure input opening closed by it. A diaphragm bed can be omitted, when an overload resistant pressure difference measuring cell is used, so that no protection of the pressure difference measuring cell by an overload diaphragm coming to rest is required.

The pressure difference sensor of the invention includes a hydraulic measuring mechanism of the invention; and a pressure difference measuring cell, wherein the pressure difference measuring cell has a measuring cell platform with two measuring chambers in its interior, which are separated from one another by a measuring diaphragm, wherein the measuring chambers each have a measuring chamber opening, wherein a first of the measuring chambers is pressure-tightly connected to the first pressure tube and contactable with a first pressure through the first pressure tube, wherein a second of the measuring chambers is pressure-tightly connected to the second pressure tube and contactable with a second pressure through the second pressure tube, wherein the measuring diaphragm is elastically deformable as a function of a difference between the first pressure and the second pressure, wherein the pressure difference measuring cell has a transducer for providing a signal dependent on the deformation of the measuring diaphragm.

In a further development of the invention, the pressure difference measuring cell is held by the pressure tubes.

In a further development of the invention, the two pressure tubes each have a branching, wherein, in each case, a branch of a pressure tube is connected to one of the measuring chambers, and wherein the respective other branch of a pressure tube has a sealable filling opening for filling the respective volumes of the pressure difference sensor communicating with the branch with a pressure transfer liquid.

In another further development of the invention, the measuring mechanism platform includes two sealable filling openings, each of which communicates with a pressure input opening, wherein the filling openings are provided for filling the respective volumes of the pressure difference sensor communicating with them with a pressure transfer liquid.

BRIEF DESCRIPTION OF THE DRAWINGS

The invention will now be explained based on the examples of embodiments presented in the drawing, the figures of which show as follows:

FIG. 3 is a schematic longitudinal section through a third example of an embodiment of a pressure difference sensor of the invention; and FIG. 4 is a schematic longitudinal section through a fourth example of an embodiment of a pressure difference sensor of the invention.

DETAILED DISCUSSION IN CONJUNCTION WITH THE DRAWINGS

Figure 1:
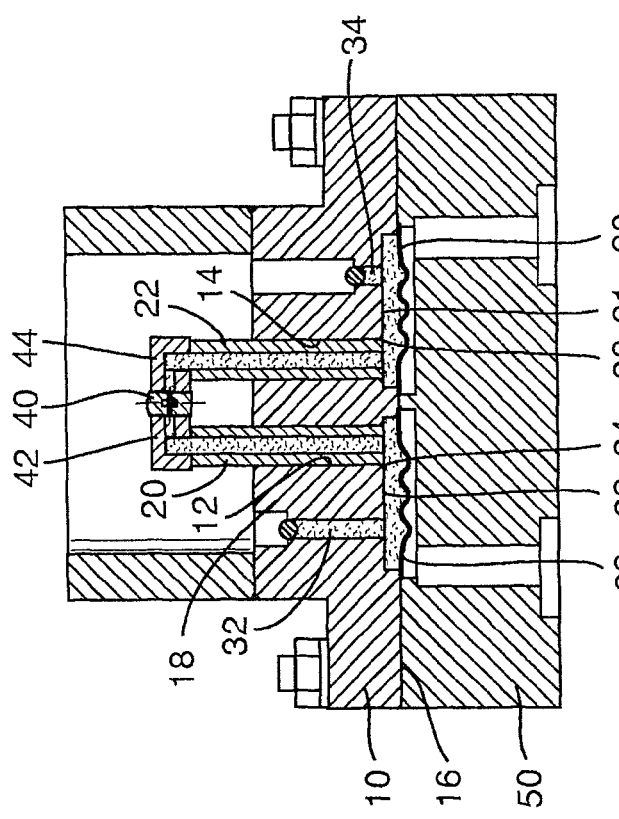
FIG. 1 is a schematic longitudinal section through a first example of an embodiment of a pressure difference sensor of the invention.

The example of an embodiment of a pressure difference sensor of the invention shown in FIG. 1 includes a measuring mechanism platform 10, through which extend first and second pressure input openings 12, 14 as straight bores from a process connection surface 16 of the measuring mechanism platform 10 to a rear side 18 of the measuring mechanism platform 10. Inserted in the bores are first and second capillary tubes 20, 22, which extend out from the rear side of the measuring mechanism platform and are connected from the process connection surface 16 with peripheral weld seams 24, 26 pressure-tightly with the measuring mechanism platform. The two pressure input openings 12, 14 are each closed with a first, respectively second, isolating diaphragm 28, 30, wherein the isolating diaphragms are each connected along a peripheral weld seam pressure-tightly with the process connection surface 16 of the measuring mechanism platform 10. First and second depressions 29, 30 covered by the isolating diaphragms 28, 30 have essentially flat bases. I.e., no diaphragm bed is provided, on which an isolating diaphragm can be supported, when it comes in contact in the case of overload. Such measures can be omitted in the present case, since the pressure difference sensor has an overload resistant pressure difference measuring cell 40, whose strength is increased by two ceramic stiffening elements 42, 44 of silicon nitride or aluminum nitride, which are joined with the pressure difference measuring cell by means of glass solder on the two sides of the pressure difference measuring cell 40. The pressure difference measuring cell is especially a micromechanical pressure difference measuring cell, which comprises silicon as material and includes a capacitive transducer. The pressure difference measuring cell 40 communicates through ducts, which extend through the stiffening bodies 42, 44, with the two pressure tubes 20, 22, wherein the stiffening elements 42, 44 are each adhered or soldered pressure-tightly and pressure bearingly on rear side end faces of the pressure tubes 20, 22.

Extending through measuring mechanism platform 10 from its rear side 18 are additionally first and second filling ducts 32 34, which open, respectively, into one of the depressions 29, 31 in the process connection surface. The volume portions of the hydraulic system of the pressure difference sensor communicating with the fillings ducts are filled via the fillings ducts with a pressure transfer liquid. Then, the filling ducts 32, 34 are pressure-tightly sealed.

The pressure difference sensor is affixed by means of bolts to a process connection block 50 with the process connection surface of the pressure difference sensor in contact with the process connection block 50.

Figure 2:
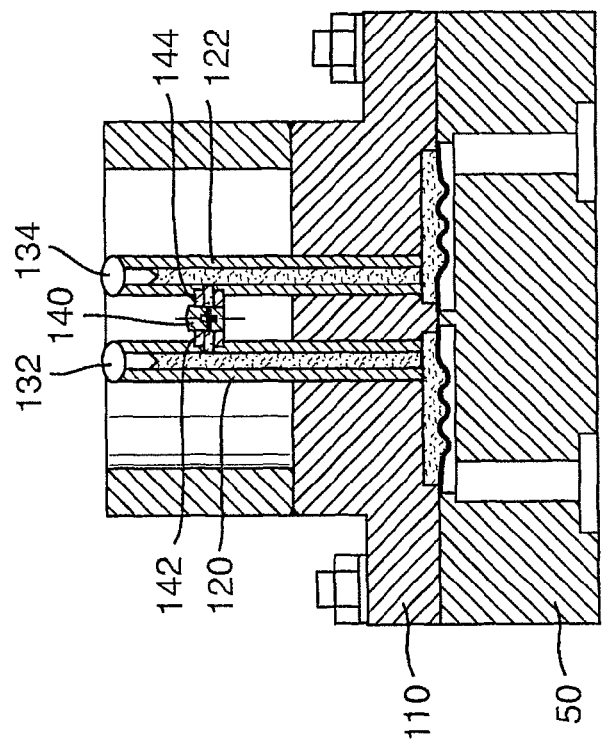
FIG. 2 is a schematic longitudinal section through a second example of an embodiment of a pressure difference sensor of the invention.

The second example of an embodiment of a pressure difference sensor shown in FIG. 2 differs from the earlier described example of an embodiment via the following details: A measuring mechanism platform 110 includes no separate filling ducts. Instead, first and second pressure tubes 120, 122, which, again, are connected from a process connection surface side of the measuring mechanism platform 110 pressure-tightly with the measuring mechanism platform, have rear side, sealable, filling openings 132, 134. For pressure loading of a pressure difference measuring cell 140, which is held between ceramic stiffening bodies 142, 144, which, again, are arranged between the pressure tubes 120, 122 and soldered with such, the pressure tubes have lateral branching bores, which communicate with ducts through the stiffening elements 142, 144.

FIG. 3 shows an example of an embodiment of a pressure difference sensor, in the case of which a measuring mechanism platform 210 has inclined extending pressure input openings, in which straight first and second pressure tubes 220, 222 are applied, on whose rear side end faces, again, a micromechanical pressure difference measuring cell 240 is held by means of two stiffening elements 242, 244. The inclination of the pressure tubes enables selection of the separation of the rear end faces, on which the stiffening element 242, 244 are to be mounted, independently of requirements for the separation between the pressure input openings on the process connection surface.

FIG. 4 shows, lastly, an example of an embodiment of a pressure difference sensor, which has a hydraulic measuring mechanism, in which overload protection is implemented. A measuring mechanism platform 310 includes pressure input openings, in which pressure tubes 320, 322 extending from a process connection surface 316, are pressure-tightly affixed with encircling joint locations 324, 326.

The joints are, however, covered by disk shaped isolating diaphragm bodies 332, 333, wherein the latter are pressure-tightly connected with the measuring mechanism platform along encircling welded seams. Isolating diaphragms 328, 330 are secured pressure-tightly on the isolating diaphragm beds, in each case, with a peripheral weld seam, wherein the isolating diaphragms 328, 330 are pressed against the diaphragm beds 329, 331 on the isolating diaphragm side surfaces of the isolating diaphragm body to form them. In the case of a one-side overload during operation of the pressure difference sensor, an isolating diaphragm can come to rest against its respective diaphragm bed 329, 331, whereby a further pressure rise behind the isolating diaphragm is prevented. In this way, a pressure difference measuring cell 340 mounted on the pressure tubes 320, 322 by means of stiffening bodies 342, 344 is protected against unlimited increasing pressures.

The invention claimed is:

1. A hydraulic measuring mechanism for registering pressure differences, comprising:
   a measuring mechanism platform having a process connection surface facing essentially in one direction, said measuring mechanism platform has a first pressure input opening, which extends from said process connection surface of said measuring mechanism platform to a rear surface of said measuring mechanism platform, said measuring mechanism platform has a second pressure input opening, which extends from said process connection surface of said measuring mechanism platform to the rear surface of said measuring mechanism platform;
   a first isolating diaphragm, which closes said first pressure input opening on a process connection surface end of said first pressure input opening;
   a second isolating diaphragm, which closes said second pressure input opening on a process connection surface end of said second pressure input opening;
   a first pressure tube, which is arranged with a section in said first pressure input opening, said first pressure tube protrudes out from the rear surface of said measuring mechanism platform; and
   a second pressure tube, which is arranged with a section in said second pressure input opening, wherein said second pressure tube protrudes out from the rear surface of said measuring mechanism platform; wherein:
   said first and said second pressure tubes are connected pressure-tightly with said measuring mechanism platform;
   at least said first pressure tube is connected from said process connection surface side pressure-tightly with said measuring mechanism platform; and
   said first pressure tube and said second pressure tube are connected pressure-tightly with said measuring mechanism platform by joining, especially welding.

2. The hydraulic measuring mechanism as claimed in claim 1, wherein:
   said first pressure tube and said second pressure tube are connected from said process connection surface side pressure-tightly with said measuring mechanism platform.

3. The hydraulic measuring mechanism as claimed in claim 1, wherein:
   at least one pressure tube extends in said measuring mechanism platform inclined relative to a surface normal of said process connection surface.

4. The hydraulic measuring mechanism as claimed in claim 1, further comprising:
   at least a first diaphragm bed body, which has a corrugated diaphragm bed on a surface facing away from said measuring mechanism platform, wherein:
   said diaphragm bed body is connected pressure-tightly with said measuring mechanism platform from said process connection surface side after the pressure-tight connecting of said at least a first pressure tube with said measuring mechanism platform.

5. The hydraulic measuring mechanism as claimed in claim 4, wherein:
   said at least one isolating diaphragm is formed by pressing against the corrugated diaphragm bed of said isolating diaphragm bed body.

6. The hydraulic measuring mechanism as claimed in claim 1, wherein:
   no corrugated diaphragm bed is present between at least one isolating diaphragm and said pressure input opening closed by it.

7. A pressure difference sensor comprising:
   a hydraulic measuring mechanism, comprising: a measuring mechanism platform having a process connection surface facing essentially in one direction, said measuring mechanism platform has a first pressure input opening, which extends from said process connection surface of said measuring mechanism platform to a rear surface of said measuring mechanism platform, said measuring mechanism platform has a second pressure input opening, which extends from said process connection surface of said measuring mechanism platform to the rear surface of said measuring mechanism platform; a first isolating diaphragm, which closes said first pressure input opening on a process connection surface end of said first pressure input opening; a second isolating diaphragm, which closes said second pressure input opening on a process connection surface end of said second pressure input opening; a first pressure tube, which is arranged with a section in said first pressure input opening, said first pressure tube protrudes out from the rear surface of said measuring mechanism platform; and a second pressure tube, which is arranged with a section in said second pressure input opening, wherein said second pressure tube protrudes out from the rear surface of said measuring mechanism platform; wherein: said first and said second pressure tubes are connected pressure-tightly with said measuring mechanism platform by joining, especially welding; and at least said first pressure tube is connected from said process connection surface side pressure-tightly with said measuring mechanism platform; and
   a pressure difference measuring cell, wherein:
   said the pressure difference measuring cell has a measuring cell platform with two measuring chambers in its interior, which are separated from one another by a measuring diaphragm;
   said measuring chambers each have a measuring chamber opening;
   a first of said measuring chambers is pressure-tightly connected to said first pressure tube and contactable with a first pressure through said first pressure tube;

a second of said measuring chambers is pressure-tightly connected to said second pressure tube and contactable with a second pressure through said second pressure tube;

said measuring diaphragm is elastically deformable as a function of a difference between the first pressure and the second pressure; and said pressure difference measuring cell has a transducer for providing a signal dependent on the deformation of said measuring diaphragm.

8. The pressure difference sensor as claimed in claim 7, wherein:

said pressure difference measuring cell is held by said pressure tubes.

9. The pressure difference sensor as claimed in claim 7, wherein:

said two pressure tubes each have a branching;

in each case, a branch of a pressure tube is connected to one of said measuring chambers; and the respectively other branch of a pressure tube has a sealable filling opening for filling the respective volumes of the pressure difference sensor communicating with the branch with a pressure transfer liquid.

10. The pressure difference sensor as claimed in claim 7, wherein:

said measuring mechanism platform includes two sealable filling openings, each of which communicates with a pressure input opening;

said filling openings are provided for filling the respective volumes of the pressure difference sensor communicating with them with a pressure transfer liquid.

* * * * *